United States Patent [19]

Younes

[11] Patent Number: 4,661,574
[45] Date of Patent: Apr. 28, 1987

[54] FLAME RETARDANT MOLDED COMPOSITION WHICH INCORPORATES A POLY[N-(BROMOPHENYL)MALEIMIDE-CO-STYRENE-CO-N-PHENYLMALEMIDE] COPOLYMER

[75] Inventor: Usama E. Younes, Newtown Square, Pa.

[73] Assignee: Atlantic Richfield Company, Los Angeles, Calif.

[21] Appl. No.: 851,028

[22] Filed: Apr. 11, 1986

Related U.S. Application Data

[62] Division of Ser. No. 685,355, Dec. 24, 1984, Pat. No. 4,609,711.

[51] Int. Cl.$^4$ .................. C08F 214/16; C08L 39/04
[52] U.S. Cl. .................................. 526/262; 521/147; 524/548; 525/203; 525/186
[58] Field of Search .................. 521/147; 524/548; 526/262; 525/186, 203

[56] References Cited

U.S. PATENT DOCUMENTS

| | | | |
|---|---|---|---|
| 3,705,209 | 12/1972 | Matack et al. | 525/186 |
| 4,072,644 | 2/1978 | Hedrick | 524/548 |
| 4,266,037 | 5/1981 | Di Guilio et al. | 524/548 |
| 4,302,484 | 11/1981 | Rosenkranz | 526/262 |
| 4,351,932 | 9/1982 | Street et al. | 524/548 |
| 4,388,451 | 6/1983 | Culbertson et al. | 526/262 |

*Primary Examiner*—Morton Foelak
*Attorney, Agent, or Firm*—Dennis M. Kozak

[57] ABSTRACT

A moldable composition which comprises a novel random N-(halogenated phenyl)maleimide-containing copolymer and a flame-retardant synergist is disclosed. The molded composition exhibits at least a 94V-1 classification when tested in accordance with Underwriters' Laboratories Inc. Test Method UL94.

5 Claims, No Drawings

FLAME RETARDANT MOLDED COMPOSITION WHICH INCORPORATES A POLY[N-(BROMOPHENYL)MALEIMIDE-CO-STYRENE-CO-N-PHENYLMALEMIDE] COPOLYMER

This is a division of application Ser. No. 685,355, filed Dec. 24, 1984, now U.S. Pat. No. 4,609,711.

This invention relates to polymers.

In one of its more specific aspects, this invention relates to a moldable polymer composition which, upon molding, exhibits excellent nonflammability properties.

The present invention provides a random N-(chlorinated or brominated phenyl)maleimide-containing copolymer and a composition which comprises a flame retardant "synergist" in combination with the random styrenic copolymer. The composition, upon molding, exhibits at least a 94V-1 classification when tested in accordance with Underwriters' Laboratories Inc. Test Method UL 94.

According to this invention there is provided a moldable composition comprising a random copolymer comprised of the following recurring units:

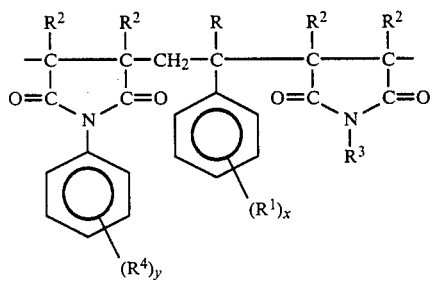

wherein R represents —H, —CH$_3$, or —CH$_2$CH$_3$; each R$^1$ separately represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group or

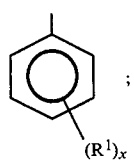

R$^4$ represents —Cl or —Br; x represents an integer of from 0 to 3; and, wherein y represents an integer of from 1 to 3; and, a flame-retardant synergist.

Also, according to this invention there is provided a method for producing a molded article which comprises (1) blending a random copolymer comprised of the following recurring units:

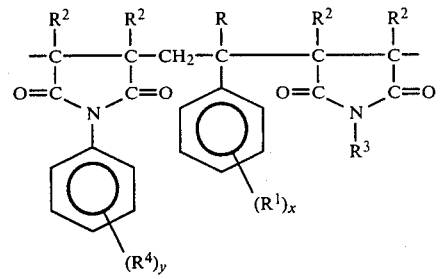

wherein R represents —H, —CH$_3$, or —CH$_2$CH$_3$; each R$^1$ separately represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group or

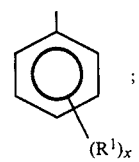

R$^4$ represents —Cl or —Br; x represents an integer from 0 to 3; and, wherein y represents an integer of from 1 to 3; and, a flame-retardant synergist; and, (2) molding the resulting blend.

According to this invention there is also provided a random copolymer comprised of the following recurring units:

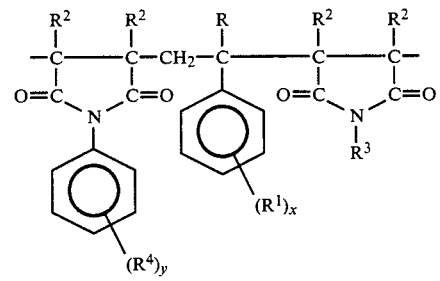

wherein R represents —H, —CH$_3$, or —CH$_2$CH$_3$; each R$^1$ separately represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group or

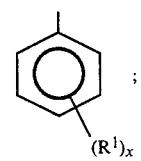

R$^4$ represents —Cl or —Br; x represents an integer of from 0 to 3 and wherein y represents an integer of from 1 to 3.

In a preferred embodiment of this invention, the total amount of chlorine and/or bromine in the random copolymer will be within the range of from about 2 to about 16 weight percent, preferably, it will be within the range of from about 3 to about 12 weight percent.

In another embodiment of this invention the random copolymer is a poly[styrene-co-N-phenylmaleimide-co-N-(brominated phenyl)maleimide].

In another embodiment of this invention, the random copolymers can be foamed using any conventional method for foaming polymers such as, for example, extruding the random copolymer in contact with a conventional foaming agent or impregnating the copolymer with a foaming agent followed by heating the impregnated copolymer above its glass transition temperature.

In another embodiment of this invention, the moldable composition comprised of a random copolymer and a synergist is employed as a flame-retardant blending component for thermoplastic resins; the composition serving as a flame-retardant for the resin. The composition of this invention can be blended with any suitable thermoplastic resin including styrene/maleic anhydride, styrene/acrylonitrile, polyphenylene oxide, styrene/N-phenylmaleimide, polyvinyl chloride, polycarbonate, polysulfone, polyarylate, polyester, polyamides and the like and their mixtures. Impact modified resins are also suitable such as, for example, rubber modified styrene/maleic anhydride copolymer.

The amount of random copolymer-synergist composition employed when blended with a thermoplastic resin is that amount effective to enhance the fire-retardant properties of the thermoplastic resin upon molding as compared with the flame-retardant properties of the thermoplastic resin in the absence of the random polymer-synergist composition. Typically, when employed as a flame retardant component, the random copolymer-synergist composition will be present in an amount within the range of from about 5 to about 50 weight percent based on the weight of the total composition.

The N-(chlorinated or brominated phenyl)maleimides which are suitable for use as the first depicted recurring unit in the random polymers of this invention are not known to be commercially available. Suitable for use are the N-(mono-, di- and tri-chloro- or bromophenyl)maleimides and include N-(4-bromophenyl)maleimide; N-(4-chlorophenyl)maleimide; N-(4-bromophenyl)citraconimide), N-(2,4,6-trichlorophenyl)maleimide and N-(2,4,6-tribromophenyl)maleimide. Bromine substituted maleimides are preferred. The random copolymer will comprise from about 3 to about 75 weight percent recurring units of this monomer. Example I demonstrates the preparation of N-(2,4,6-tribromophenyl)maleimide.

In the practice of this invention, any suitable monomers can be employed to produce the second depicted recurring monomeric unit in the above general structure for the copolymer. Suitable monomers include: styrene, α-methylstyrene, α-ethylstyrene, methylstyrene, isopropylstyrene, t-butylstyrene, vinylbenzoic acid, vinyl phenol, vinyl analine, nitrostyrene, cyanostyrene, methoxystyrene, α-methyl-4-cyanostyrene, α-methyl-4-methylstyrene and the like, and their mixtures. Styrene is the preferred monomer. The random copolymer will comprise of from about 40 to about 95 weight percent recurring units of this monomer.

In the practice of this invention, any suitable monomers can be employed to produce the third depicted recurring monomeric unit in the above general structure. Suitable monomers include: N-methylmaleimide, N-phenylmaleimide, N-phenylcitraconimide, N-phenyl-3,4-dimethyl-maleimide, N-(4-cyanophenyl)maleimide, N-(4-hydroxyphenyl)maleimide, N-(4-aminophenyl)maleimide, N-(4-methoxyphenyl)maleimide, N-(4-benzamide)maleimide and the like, and their mixtures. N-phenylmaleimide is most preferred. And, although an alkyl aryl substituted maleimide is preferred, maleimide may also be used. The random compolymer will comprise from about 1 to about 62 weight percent recurring units of this monomer.

If the random copolymer of this invention is used to produce molded articles the number average molecular weight of the copolymers should be at least 30,000, preferably, 80,000 to about 500,000.

To produce a moldable composition of this invention the random copolymer can be conventionally blended with any suitable flame-retardant synergist. The synergist will typically be employed in an amount within the range of from about 1 to about 10, preferably from about 1 to about 5 weight percent of the total composition.

Suitable synergists include: antimony trioxide, antimony pentoxide, arsenic trioxide, arsenic pentoxide, zinc sulfate, zinc oxide, zinc borate, bismuth oxide, molybdenum oxide, tungsten oxide, stannous oxide and the like, and their mixtures. The preferred synergist is antimony trioxide.

Optionally, the molding composition can include other ingredients. Such as extenders, smoke suppressants, antioxidants, reinforcing fillers, processing aids, pigments, stabilizers, mold release agents and the like, for their conventionally employed purpose.

This invention is further demonstrated by the following examples.

EXAMPLE I

This example demonstrates the preparation of N-(2,4,6-tribromophenyl)maleimide.

Into a reaction vessel were added and mixed 100 g. (0.303 mole) of 2,4,6-tribromoanaline, 68.34 g (0.697 mole) of maleic anhydride, and 5.16 g (0.379 mole) of zinc chloride.

The resulting mixture was heated at a temperature within the range of from about 139° to 148° C. for about 2 hours.

The resulting reaction product was extracted with xylene, filtered and water washed.

The xylene solvent was removed and the resultant product N-(2,4,6-tribromophenyl)maleimide was recovered at a yield of about 94%.

EXAMPLE II

This example demonstrates the preparation of a copolymer of this invention which contains recurring units of styrene, N-phenylmaleimide and N-(2,4,6-tribomophenyl maleimide).

Into a one-gallon stirred reactor were charged 2367 g of methyl ethyl ketone, 361.4 g of styrene, 528.2 g N-phenylmaleimide and 124.56 g of the N-(2,4,6-tribromophenyl)maleimide produced, using the procedure of Example 1.

About 0.83 g of benzoyl peroxide was added to the reaction mixture and the mixture heated to 75° C.

The resulting polymerization reaction was allowed to proceed for five hours, and then 5 g of butylated hydroxytoluene ("BHT") were added.

The copolymer was recovered by precipitation from methanol, filtered, washed with methanol and dried under vacuum.

The recovered random copolymer was found to contain 61% N-phenylmalemide and about 7% tribromophenyl maleimide (4.1% bromine).

The copolymer was found to have a glass transition temperature of 228° C. (by Differential Scanning Calorimetry "DSC"), a number average molecular weight of 124,000 and a weight average molecular weight of 248,000 as measured by gel permeation chromotography using polystyrene standards.

EXAMPLE III

This examples demonstrates the preparation of a copolymer of this invention which contains recurring units of α-methylstyrene, N-phenylcitraconimide and N-(2,4,6-tribromophenyl maleimide).

Into a one-gallon stirred reactor is charged 2367 g of methyl ethyl ketone, 313 g of α-methyl styrene, 577 g of the N-phenylcitraconimide and 125 g of the tribromophenyl maleimide produced using the procedure of Example I.

About 0.8 g of benzoyl peroxide is added to the reaction mixture and the mixture is heated to 75° C.

The resulting polymerization reaction is allowed to proceed for five hours, and then 5 g of BHT are added.

The copolymer, a poly(N-(2,4,6-tribromophenyl maleimide-co-α-methylstyrene-co-N-phenylcitraconimide terpolymer is recovered by precipitation from methanol, filtering, washing with methanol and drying under vacuum.

The resulting copolymer is then blended with about 4 weight percent antimony trioxide based on the total weight of the copolymer plus the antimony trioxide.

Next, about 45 weight percent of the resulting blend and about 55 weight percent of polycarbonate is melt blended at 550° F. extruded and injection molded to produce a molded composition of this invention.

EXAMPLE IV

The copolymer produced in Example 2 was melt blended at 550° F. with 4% antimony trioxide based on the weight of the total composition (copolymer plus synergist),. The resulting blend was molded and the molded blend was tested for flammability in accordance with Underwriters Laboratories UL 94 (UL 94 Standard for Tests for Flammability of Plastic Materials For Parts in Devices and Appliances, UL 94, third edition Jan. 24, 1980).

In this UL 94 Vertical Burning Test, the molded copolymer test specimen was supported from the upper end, with the longest dimension vertical, by a clamp on a ring stand so that the lower end of the specimen was 1″ above the top of the burner tube. The burner was then placed remote from the sample, ignited, and adjusted to produce a blue flame 1″ in height. The test flame was placed centrally under the lower end of the test specimen and allowed to remain for 10 seconds. The test flame was then withdrawn, and the duration of flaming or glowing combustion of the specimen was noted. If flaming or glowing combustion of the specimen ceased within 30 seconds after removal of the test flame, the test flame was again placed under the specimen for 10 seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or glowing combustion of vertical specimens after application of the test flame (average of 5 specimens with 10 flame applications) should not exceed 25 seconds (maximum not more than 30 seconds) and the portion of the specimen outside the clamp should not be completely burned in the test.

Materials which comply with the above requirements and do not drip any flaming particles or droplets during the burning test are classified as "V-1". Materials which comply with the above requirement but drip flaming particles or droplets which burned briefly during the test are classified as "V-2". A "V-0" rating is given to materials wherein the duration of flaming or glowing combustion averages less than 5 seconds under the conditions specified above.

The results of the UL 94 testing was as follows:

| Molded Composition of | UL 94 (5″ × ½″ × ⅛″) |
|---|---|
| Example 2 | V-0 |

It will be evident from the foregoing that various modifications can be made to this invention. Such, however, are considered as being within the scope of the invention.

What is claimed is:

1. A random copolymer comprised of the following recurring units.

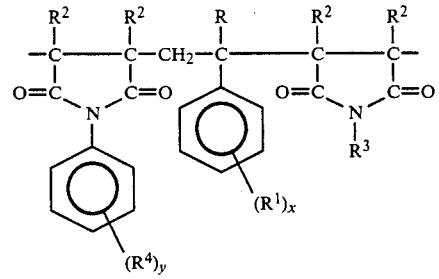

wherein R represents —H, —CH$_3$, or —CH$_2$CH$_3$; each R$^1$ separately represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group or

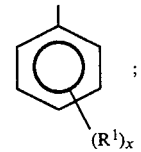

R$^4$ represents —Cl or —Br; x represents an integer of from 0 to 3 and wherein y represents an integer of from 1 to 3.

2. The random copolymer of claim 1 in which R$^3$ represents a hydrogen.

3. The random copolymer of claim 1 being poly[styrene-co-N-phenylmaleimide-co-N-(brominated phenyl)maleimide].

4. The random copolymer of claim 1 containing from about 2 to about 6 total weight percent of chlorine and/or bromine.

5. The random copolymer of claim 1 containing from about 3 to about 12 total weight percent of chlorine and/or bromine.

* * * * *